Figures 1, 2, 3:
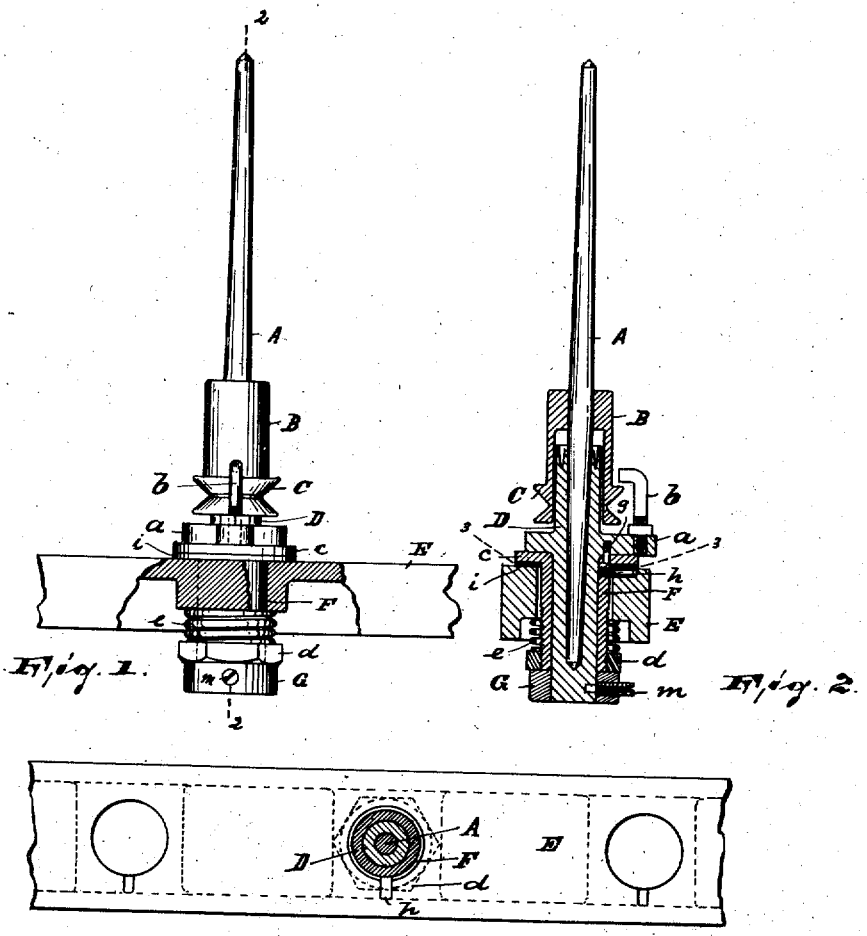

R. ATHERTON.

SUPPORTING DEVICE FOR SPINDLES.

No. 11.521. Reissued Jan. 14, 1896.

WITNESSES:

Benjamin Carly

Duncan M. Robertson.

INVENTOR:

Robert Atherton

BY Partner & Co

ATTORNEYS

UNITED STATES PATENT OFFICE.

ROBERT ATHERTON, OF PATERSON, NEW JERSEY.

SUPPORTING DEVICE FOR SPINDLES.

SPECIFICATION forming part of Reissued Letters Patent No. 11,521, dated January 14, 1896.

Original No. 516,042, dated March 6, 1894. Application for reissue filed November 29, 1895. Serial No. 570,537.

*To all whom it may concern:*

Be it known that I, ROBERT ATHERTON, of Paterson, in the county of Passaic and State of New Jersey, have invented a new and Improved Supporting Device for Spinning-Spindles, of which the following is a full, clear, and exact description.

My invention relates to an improvement in supports for spinning-spindles of a type that permits the spindle to yield laterally to a limited degree and by "self-adjustment" compensate for variable strains to which such devices are subjected in operation, the object of my invention being to provide an independent yielding casing secured on the rail, into which casing the bolster and spindle are inserted so as to be readily removed without interfering with the casing and its adjustment on the rail.

My invention consists in the peculiar construction and combination of parts, as is hereinafter described and claimed.

Reference is to be had to the accompanying drawings, forming a part of this specification, in which similar letters of reference indicate corresponding parts in all the figures.

Figure 1 is a broken side view of a spindle-rail, partly in section, a spindle and the bolster thereon, and the improved bolster-casing engaging the spindle-rail and bolster. Fig. 2 is a sectional side view on the line 22 in Fig. 1, and Fig. 3 is a sectional plan view on the line 3 3 in Fig. 2.

The spindle A, concentric sleeve B, having the band-whirl C formed on it, and bolster D are of well-known form, not requiring a detailed description further than the statement that the spindle is rotatably supported by the bolster in the usual way and that the sleeve B loosely envelops the free upper end portion of the bolster, thereby disposing the whirl C near to the collar *a*, that radially projects from the bolster and that often has contact with a spindle-rail, such as E, the usual band-guard *b* projecting from the collar near to the whirl. The shank of the bolster D that projects downward from the collar *a*, and wherein the lower end of the spindle A is axially stepped, is made cylindrical externally and of a suitable diameter to fit neatly within the true axial bore of the casing F, which is a feature of the improvement.

The casing F is preferably made cylindrical in the body and provided with a fixed or integral radial flange *c* at the upper end, a detachable flange or collar *d* being located on the body of the box at its lower end.

Preferably there is a screw-thread produced on the exterior of the cylindrical casing F for the reception of the internally-threaded collar *d*, as represented in Fig. 2, whereby the latter is adjustably secured on the lower end of the casing.

The spindle-rail E is of the ordinary construction provided in such a portion of the frame of a spinning-machine, it being recessed at proper intervals, leaving thicker portions remaining, which latter are vertically perforated for the introduction of spindle-supports. In this case the spindle-rail E is perforated in series, as indicated in Fig. 3, the diameter of each hole being so proportioned that the body of the casing F will freely enter and be permitted to wabble slightly if unrestrained.

The shank of the bolster D is of such a relative length as will allow it to project a suitable degree below the rail E, and the casing F also extends below the portion of the rail in which it is located, providing a space between the adjustable collar *d* and the lower surface of the rail E for the introduction of a spiral spring *e* that is loosely fitted upon the casing-body, and that may be more or less compressed endwise by an adjustment of the collar *d*. A dowel-pin *g* is provided to lock the collar *a* of the bolster to the radial flange *c* of the casing F, and while it is shown as secured in the collar *a* and in loose engagement with the radial flange named it is evident that this engagement of parts may be reversed and the same service rendered by the pin.

The body of the casing F is loosely secured from rotation by the laterally-projecting pin *h* that is fastened by one end in the wall of the same, and engages with a suitable groove in the top face of the rail E, as indicated in Fig. 2.

An elastic washer *i* is placed on the body of the casing F and intervenes between the rail E and flange *c*, affording a slightly yielding seat for the latter and for the parts supported by it.

A locking-ring G is placed on the end portion of the shank of the bolster D, which extends below the casing F, and is thereto removably secured by set-screw *m* that is preferably doweled in the shank, as shown in Fig. 2.

In operation any overload of the spindle A on one side, or improper draft strain of the band that engages the whirl C, will be compensated for by the slight yielding of the casing F, which will resume a normal vertical position when the parts are restored to a balanced condition. In case it is necessary to remove a spindle from the frame of the machine it is quickly effected by removing the locking-ring G, which will release the shank of the bolster D, that may then be lifted out of the casing F without impediment or in any manner deranging the connection of the latter with the rail E.

Having thus fully described my invention, I claim as new and desire to secure by Letters Patent—

1. In a spindle support, the combination with the perforated recessed spindle rail, of the flanged bolster casing loosely extending through the rail, an elastic washer placed between the flange of said casing and the top of the rail; a collar on the lower end of the casing; a spring intervening between said collar and the rail, the bolster fitted in the casing and projecting through the lower end thereof, a locking ring removably secured to the lower end of the bolster and a whirl driven spindle in the bolster, substantially as described.

2. In a spindle support, the combination with the perforated recessed spindle rail, of the flanged cylindrical bolster casing loosely extending through the rail and locked from rotation, an elastic washer placed between the flange of said casing and the top of the rail, an adjustable collar on the lower end of the casing below the rail, a spring intervening between said collar and the rail, the bolster fitted in the casing and projecting through the lower end thereof, a locking ring removably secured to the lower end of the bolster, the spindle, and means for rotating the same in the bolster, substantially as described.

In testimony that I claim the foregoing I have hereunto set my hand this 13th day of November, 1895.

ROBERT ATHERTON.

Witnesses:
E. B. HINDLEY,
FREDERICK L. ATHERTON.